(12) United States Patent
Yang

(10) Patent No.: US 9,582,658 B2
(45) Date of Patent: Feb. 28, 2017

(54) SCREEN UNLOCKING METHOD

(71) Applicant: WISTRON CORP., New Taipei (TW)

(72) Inventor: Carl Z Yang, New Taipei (TW)

(73) Assignee: WISTRON CORP., New Taipei (TW)

( * ) Notice: Subject to any disclaimer, the term of this patent is extended or adjusted under 35 U.S.C. 154(b) by 102 days.

(21) Appl. No.: 14/688,907

(22) Filed: Apr. 16, 2015

(65) Prior Publication Data
US 2016/0188869 A1    Jun. 30, 2016

(30) Foreign Application Priority Data
Dec. 24, 2014    (CN) .......................... 2014 1 0821350

(51) Int. Cl.
G06F 21/44      (2013.01)
G06F 3/0488    (2013.01)
G06F 21/36      (2013.01)

(52) U.S. Cl.
CPC .......... *G06F 21/44* (2013.01); *G06F 3/04883* (2013.01); *G06F 21/36* (2013.01)

(58) Field of Classification Search
CPC ....... G06F 21/44; G06F 3/04883; G06F 21/36
See application file for complete search history.

(56) References Cited

U.S. PATENT DOCUMENTS

| 2009/0241072 A1* | 9/2009 | Chaudhri | G06F 3/04883 715/863 |
| 2009/0264159 A1* | 10/2009 | Hsieh | H04M 1/67 455/566 |
| 2011/0265045 A1* | 10/2011 | Hsieh | G06F 3/04883 715/863 |
| 2012/0050009 A1* | 3/2012 | Hsieh | G06F 21/36 340/5.51 |
| 2013/0091468 A1* | 4/2013 | Xie | H04M 1/67 715/835 |

(Continued)

FOREIGN PATENT DOCUMENTS

| CN | 101634925 A | 1/2010 |
| CN | 102231094 A | 11/2011 |

(Continued)

OTHER PUBLICATIONS

Taiwan Office Action dated Nov. 19, 2015 in application No. 104102396.

*Primary Examiner* — Joseph P Hirl
*Assistant Examiner* — J. Brant Murphy
(74) *Attorney, Agent, or Firm* — Maschoff Brennan

(57) ABSTRACT

A screen unlocking method applied to an electronic device including a touch screen and storing graphic patterns and a plurality of text data is provided. Each of the graphic patterns corresponds to one piece of the text data. Display an unlocking mark on the touch screen locked. Detect a movement trace of an object touching the touch screen. When the object touches the unlocking mark, search for the graphic pattern most similar to the movement trace. Enable an interface for displaying at least the text data corresponding to the graphic pattern most similar to the movement trace. Selectively transmit an image of at least one part of the interface to a social networking website or a social application that is random or preset, and unlock the touch screen after a preset condition is satisfied.

12 Claims, 7 Drawing Sheets

(56) References Cited

U.S. PATENT DOCUMENTS

| | | | | |
|---|---|---|---|---|
| 2013/0174094 A1* | 7/2013 | Heo | .................... | G06F 3/04883 |
| | | | | 715/835 |
| 2013/0283165 A1* | 10/2013 | Hua | ....................... | G06F 3/017 |
| | | | | 715/727 |
| 2013/0321305 A1* | 12/2013 | Liang | ................. | G06F 3/04883 |
| | | | | 345/173 |
| 2014/0176468 A1* | 6/2014 | Dang | ....................... | G06F 3/041 |
| | | | | 345/173 |
| 2014/0229899 A1* | 8/2014 | Lee | ....................... | G06F 3/0488 |
| | | | | 715/835 |
| 2014/0267064 A1* | 9/2014 | Lu | .......................... | G06F 3/041 |
| | | | | 345/173 |
| 2014/0298191 A1* | 10/2014 | Luu | .................... | G06F 3/04883 |
| | | | | 715/741 |
| 2014/0317723 A1* | 10/2014 | Hicks | ...................... | G06F 21/36 |
| | | | | 726/19 |
| 2014/0317724 A1* | 10/2014 | Hicks | ...................... | G06F 21/36 |
| | | | | 726/19 |
| 2014/0365904 A1* | 12/2014 | Kim | ...................... | G06F 3/0484 |
| | | | | 715/741 |
| 2015/0277697 A1* | 10/2015 | Liu | ....................... | G06F 3/0488 |
| | | | | 345/173 |
| 2015/0339466 A1* | 11/2015 | Gao | ....................... | G06F 21/36 |
| | | | | 726/16 |

FOREIGN PATENT DOCUMENTS

| | | | |
|---|---|---|---|
| CN | 103365540 | A | 10/2013 |
| CN | 103491243 | A | 1/2014 |
| TW | 201137658 | A1 | 11/2011 |
| TW | 201316247 | A1 | 4/2013 |
| TW | 201324310 | A1 | 6/2013 |

* cited by examiner

SCREEN UNLOCKING METHOD

CROSS-REFERENCE TO RELATED APPLICATIONS

This non-provisional application claims priority under 35 U.S.C. §119(a) on Patent Application No(s). 201410821350.4 filed in China on Dec. 24, 2014, the entire contents of which are hereby incorporated by reference.

TECHNICAL FIELD

The disclosure relates to a screen unlocking method, more particularly to a screen unlocking method capable of providing users some fun during unlocking screen.

BACKGROUND

Electronic devices having a touch screen nowadays have a lock screen function that prevents the electronic device from accidental touches that may make the electronic device perform undesired applications or operation. The lock screen function supported by these electronic devices in the market requires users to perform a certain action: such as entering a preset password, dragging a lock icon or an app icon shown on the touch screen, or performing a preset gesture using the touch screen. However, these unlock mechanisms are unchangeable and have no variety such that users may feel bored with the unlock mechanisms to unlock the electronic devices.

SUMMARY

According to one ore more embodiments, the disclosure provides a screen unlocking method applied to an electronic device that includes a touch screen and stores a plurality of graphic patterns and a plurality of text data, and each of the graphic patterns corresponds to one piece of the text data. In one embodiment, the screen unlocking method includes the following steps. Under a screen-locked state, display an unlocking mark on the touch screen. Detect a movement trace of an object touching the touch screen, and determine whether the object touches the unlocking mark. When the object touches the unlocking mark, compare the movement trace with each of the graphic patterns to find out the graphic pattern that is most similar to the movement trace. After the graphic pattern most similar to the movement trace is found out, enable an interface for displaying at least the text data corresponding to the graphic pattern most similar to the movement trace. Selectively send an image of at least a part of the interface to a social networking website or a social application that is random or preset, and after a preset condition is satisfied, disable the screen-locked state.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
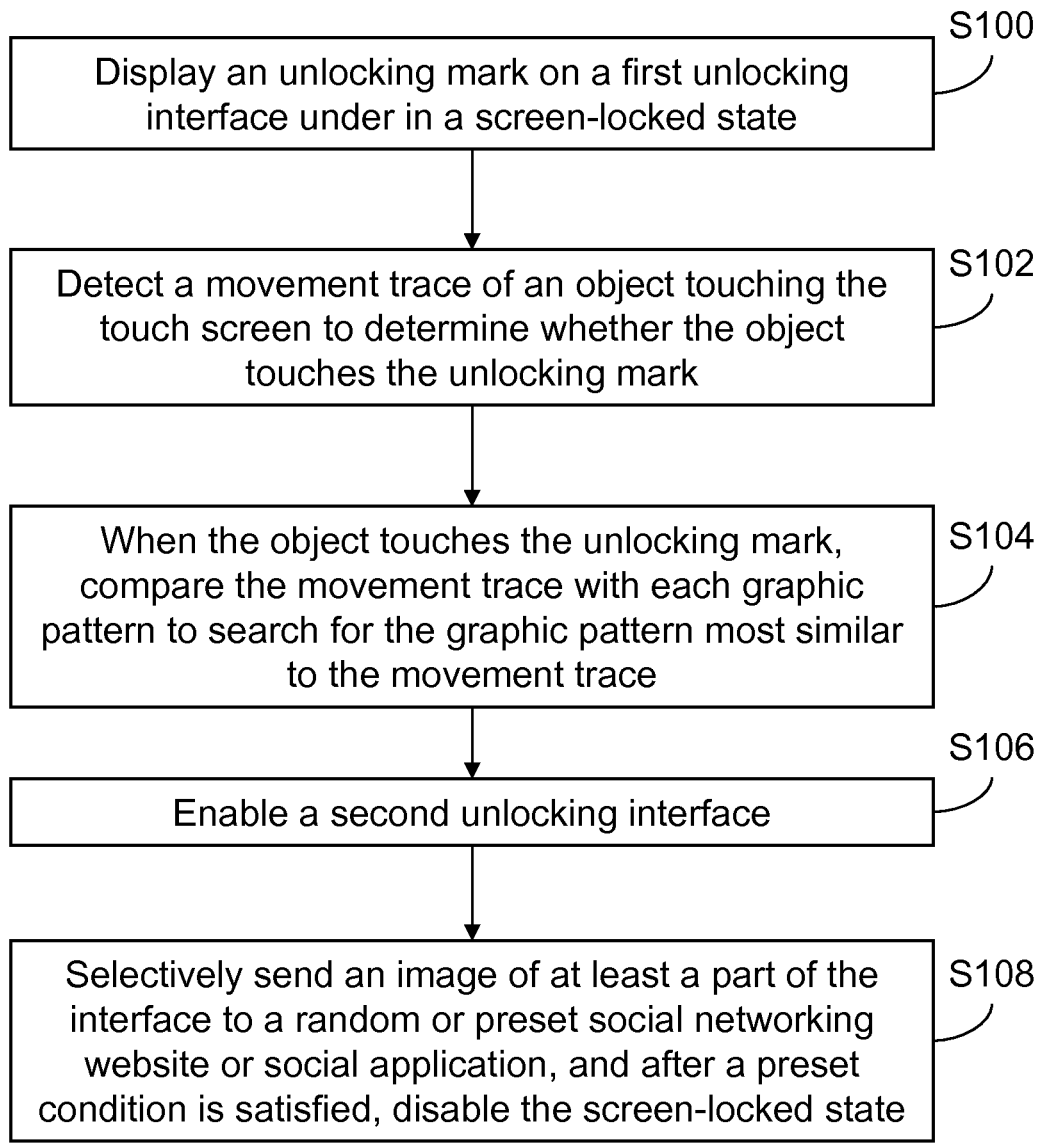
FIG. 1 is a flow chart of a screen unlocking method according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a flow chart of a screen unlocking method according to an embodiment. The screen unlocking method is applied to an electronic device including a touch screen. For example, the electronic device is a computing device, such as a smart phone, a tablet computer or a notebook with a touch screen, which has touch control, storage and computing functions.

In an exemplary embodiment, the electronic device stores a plurality of graphic patterns and a plurality of text data in advance, and each of the graphic patterns corresponds to one piece of the text data. For instance, each of the graphic patterns is paired with one piece of the text data. For example, the graphic pattern is a geometric figure made up of at least one line, or is a photo or drawing of human, animal, plant, goods and/or landscape. For example, the text data includes, but not limited to, a text, a trivia and/or a xiehouyu (or pun), corresponding to the content of the graphic pattern. In an exemplary embodiment, the electronic device updates graphic patterns and text data in the electronic device when connecting to a network server system through its communication interface. For example, the communication interface is carried out by the wired communication technology or wireless communication technology.

The details of the screen unlocking method are described as follows.

Figure 2:
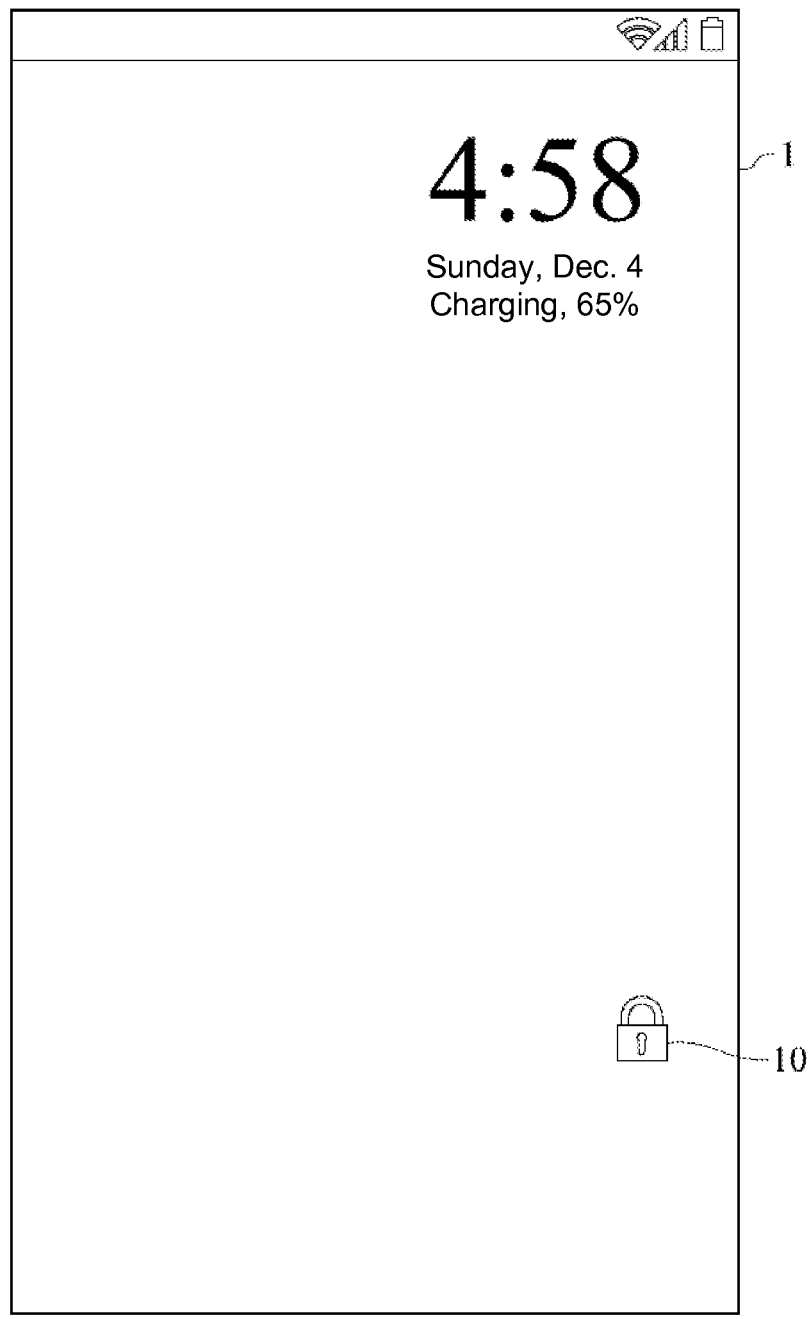
FIG. 2 is a schematic diagram of a first unlocking interface according to an embodiment.

In step S100, when the electronic device operates in a screen-locked state, the touch screen displays a first unlocking interface 1 as shown in FIG. 2, which is a schematic diagram of a first unlocking interface according to an embodiment. In an exemplary embodiment, the first unlocking interface 1 shows device information as well as an unlocking mark 10. In other words, the electronic device in the screen-locked state displays the first unlocking interface 1 having the unlocking mark 10 on its touch screen. For example, the unlocking mark 10 shown in the first unlocking interface 1 is, but not limited to, an unlocked icon, a stellar icon, a spot icon, or other geometric icons. For example, the device information shown in the first unlocking interface 1 is, but not limited to, a date, time, the quantity of battery electricity, and/or a network connection state. In practice, the first unlocking interface 1 shows the unlocking mark 10 at least.

The location of the unlocking mark 10 on the touch screen can be any position on the touch screen but not limited to the location of the unlocking mark 10 in the first unlocking interface 1 as shown in FIG. 2. For example, the unlocking mark 10 is an icon predeterminedly shown at a certain coordinate point on the touch screen, or is an icon shown at a random coordinate point on the touch screen.

In step S102, the electronic device detects a movement trace that an object touches and moves on the touch screen, to determine whether the object touches the unlocking mark 10 in the first unlocking interface 1. In other words, the electronic device detects a movement trace that the object touches the first unlocking interface 1 such that the electronic device can determine whether the object touches the unlocking mark 10.

Figure 3:
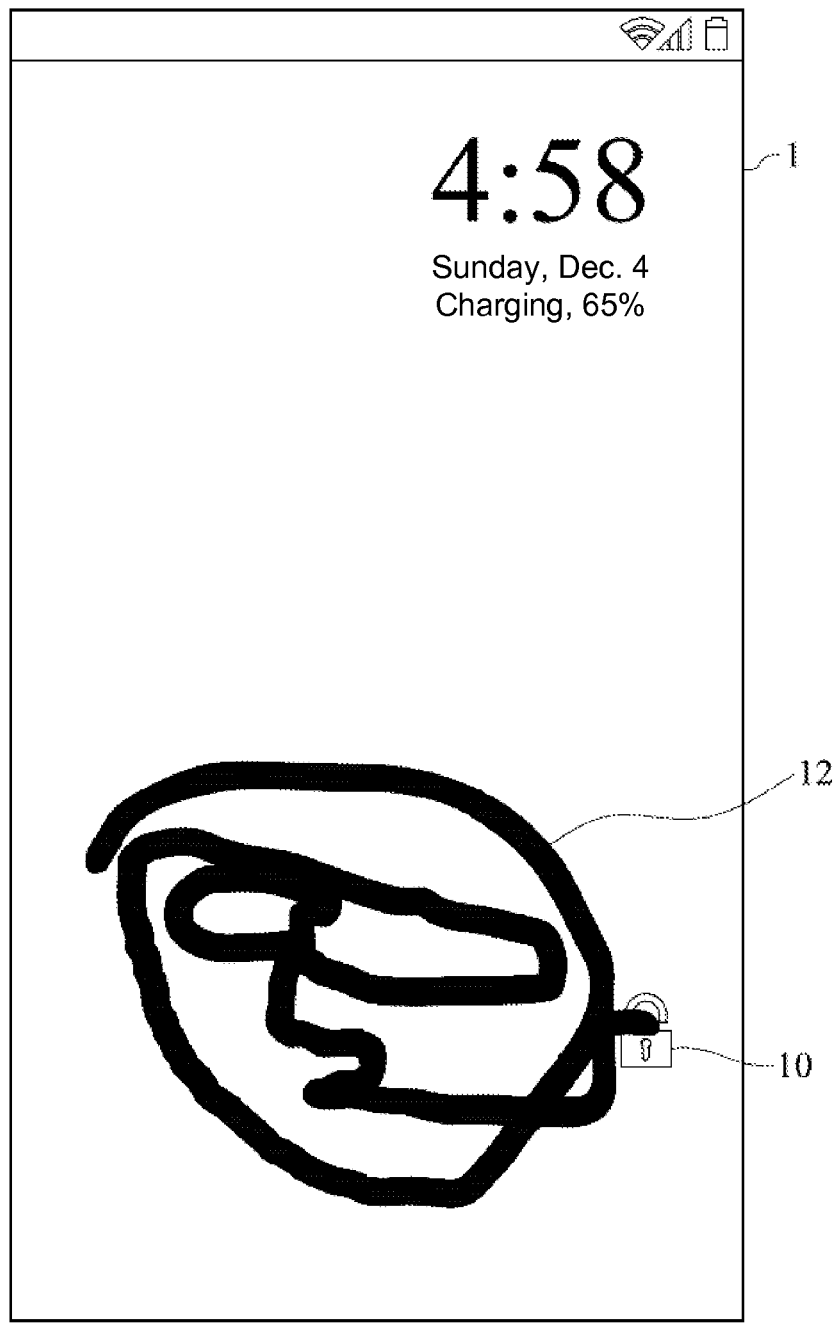
FIG. 3 is a schematic diagram of the first unlocking interface during the screen unlocking according to an embodiment.

In an exemplary embodiment of step S102, when a user intends to use the first unlocking interface 1, as shown in FIG. 3, to swipe the touch screen to unlock the touch screen, the electronic device detects a movement trace 12 that a certain object touches the touch screen and determines whether the object touches the unlocking mark 10, so as to determine whether to switch off the screen-locked state. For example, the object is, but not limited to, the user's finger or a touch pen. For example, the movement trace 12 is, but not limited to, a continuous trace. In another example, the movement trace 12 is a discontinuous path. If the occurrences of two sequential traces of touching on the touch screen have an internal of a preset time period therebetween, such a discontinuous path is accounted a movement trace 12.

Figure 4A:
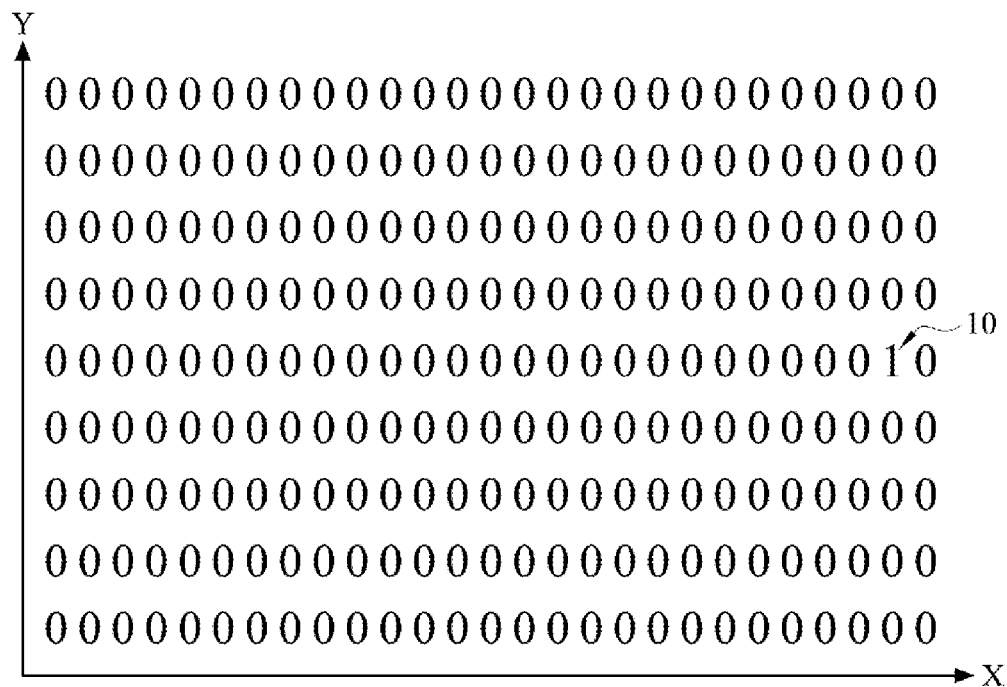
FIG. 4A is a schematic diagram of setting an unlocking mark on the touch screen according to an embodiment.
Figure 4B:
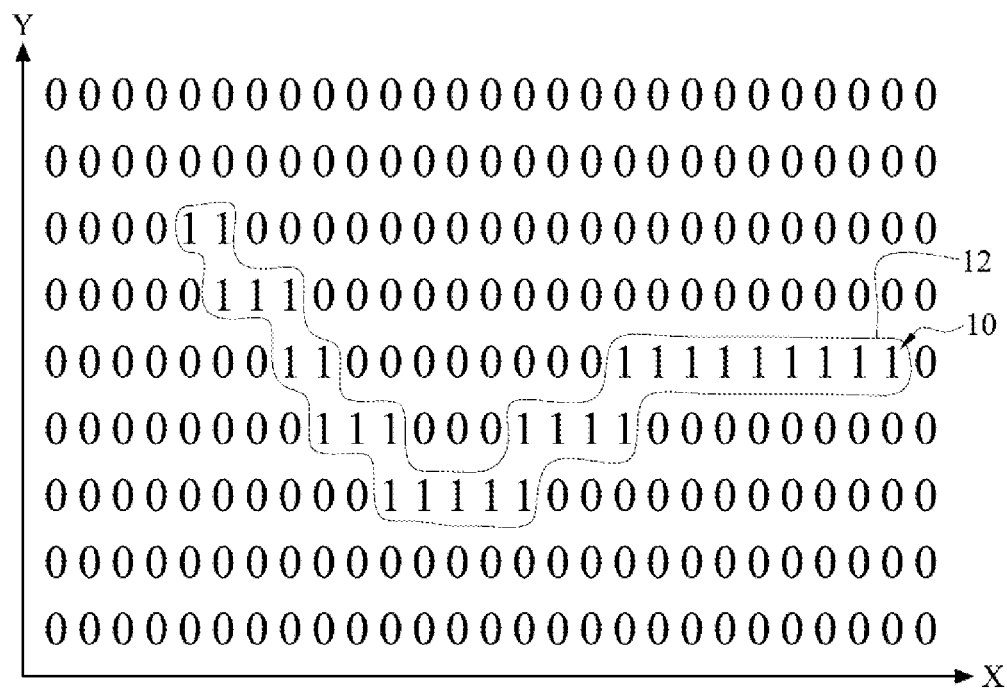
FIG. 4B is a schematic diagram of a movement trace of an object detected by the touch screen according to an embodiment.

The detail of step S102 is described as follows by referring FIG. 4A and FIG. 4B. FIG. 4A is a schematic diagram of setting an unlocking mark on the touch screen according to an embodiment, and FIG. 4B is a schematic diagram of a movement trace of an object detected by the touch screen according to an embodiment. After the first unlocking interface 1 in FIG. 2 is shown on the touch screen, the touch screen sets an initial value for the coordinate point of the unlocking mark 10 to be "b=1" and sets initial values for other coordinate points on the touch screen to be "b=0" by an algorithm, as shown in FIG. 4A.

As shown in FIG. 4B, if an object swipes on the touch screen for screen unlocking, the value for the coordinate point of the touch point becomes "a=1". If the touch point on the touch screen does not belong to the unlocking mark 10, the value for the coordinate point of the touch point not belonging to the unlocking mark 10 will become 1. In other words, when "a" is different from "b", the value of "b" will be replaced by the value of "a". If the touch point on the touch screen belongs to the unlocking mark 10, since the initial value for the coordinate point of the unlocking mark 10 is 1, the value for the coordinate point of the unlocking mark 10 will not change and the detection of the movement trace 12 will end. In other words, when "a" is equal to "b", the detection of the movement trace 12 will end. In this exemplary embodiment, the movement trace 12 is made up of the coordinate points whose values are 1, as shown in FIG. 4B.

In step S104, when the object touches the unlocking mark 10, the electronic device will compare the movement trace 12 with each of the graphic patterns to search for the graphic pattern most similar to the movement trace 12. In an exemplary embodiment, the movement trace 12 seems like a human face as shown in FIG. 3, and after comparing the movement trace 12 with each of the graphic patterns, the electronic device finds out the graphic pattern showing a human face most similar to the human face made up of the movement trace 12. For example, the similarity comparison between the movement trace and the graphic pattern is carried out by, but not limited to, a face recognition algorism, a character recognition algorism or a shape recognition algorism.

Figure 5A:
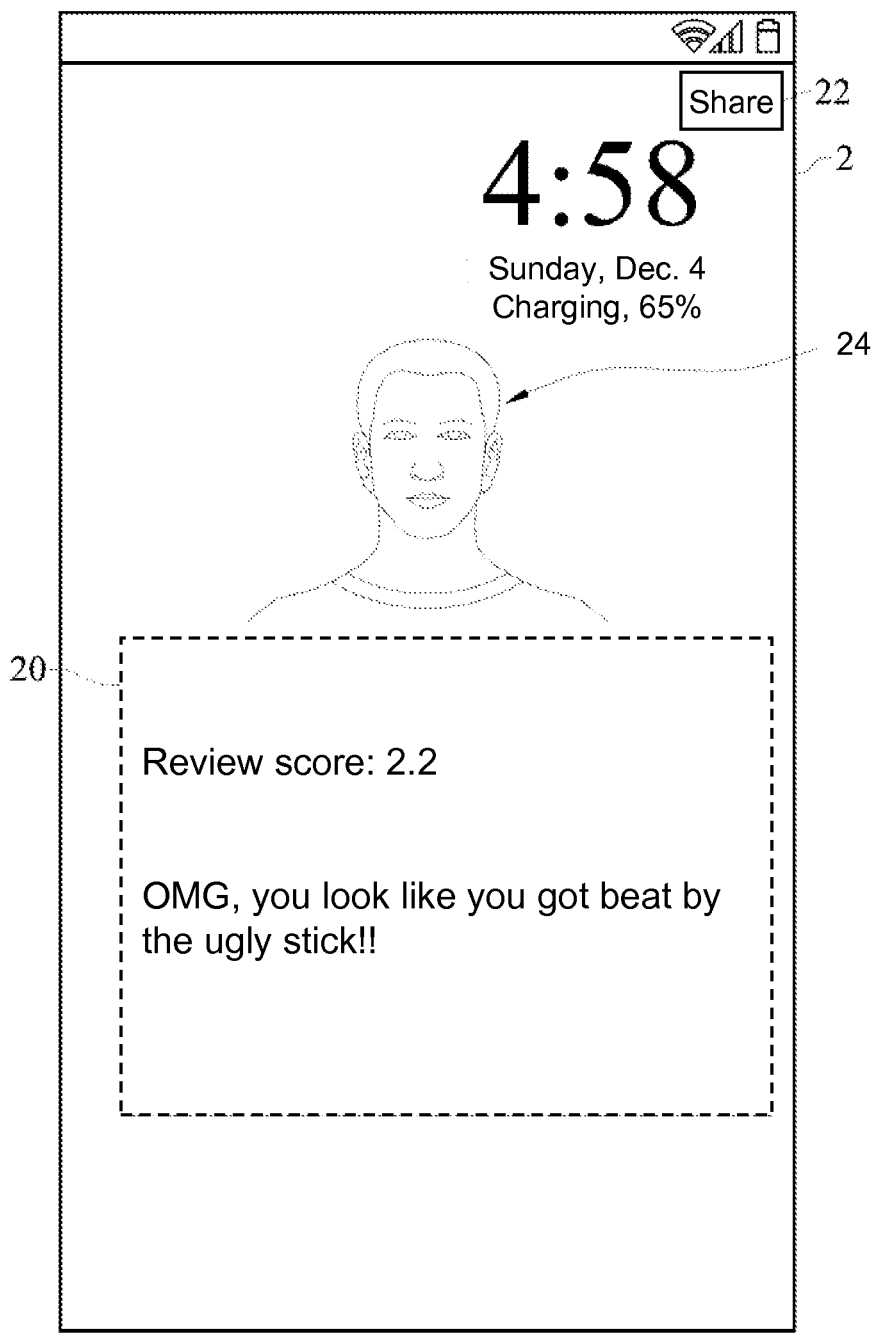
FIG. 5A is a schematic diagram of a second unlocking interface according to an embodiment.

In step S106, after the graphic pattern most similar to the movement trace 12 is found out, the electronic device enables a second unlocking interface 2 as shown in FIG. 5A, which is a schematic diagram of a second unlocking interface according to an embodiment. The second unlocking interface 2 displays the text data 20 corresponding to the graphic pattern most similar to the movement trace 12. In an exemplary embodiment, if the electronic device considers that the movement trace 12 is most similar to the graphic pattern presenting a human face, the second unlocking interface 2 displays the text data 20 of "OMG, you look like you got beat by the ugly stick!!" associated with the human face.

In an exemplary embodiment, the text data 20 in FIG. 5A includes a review of "OMG, you look like you got beat by the ugly stick!!" as well as a review score that is 2.2, and the content of the review in the text data 20 is associated with the graphic pattern corresponding to the text data 20. In an exemplary embodiment, the review score in the text data 20 shown in FIG. 5A is a certain value and is associated with the content of the graphic pattern corresponding to the text data 20. In other words, the text data 20 corresponding to each of the graphic patterns predeterminedly includes a review score. For example, the review score in the text data 20 for the graphic pattern showing a human face is 2.2, and the review score in the text data 20 for the graphic pattern showing a piggy is 2.8. The disclosure has no limit on the design of the review score, and the review score is designed according to actual application requirements.

In another exemplary embodiment, the review score in the text data 20 shown in FIG. 5A is directly proportional to the degree of similarity between the movement trace 12 and the graphic pattern most similar to the movement trace 12. In other words, the more the drawing made up of the movement trace 12 is similar to a graphic pattern, the higher the review score in the text data 20 is. For example, when the electronic device compares the movement trace 12 with a graphic pattern showing a certain human face, the more the drawing made up of the movement trace 12 is similar to the human face, the higher the degree of similarity is, thereby obtaining a higher review score in the text data 20.

In addition, the second unlocking interface 2 also includes a sharing control icon 22 (referred to as first control icon) for sharing an image of at least a part of the second unlocking interface 2 to a random or preset social networking website or a random or preset social application when selected. For example, the social networking website is, but not limited to, Facebook, Twitter, Plurk, Google+, Instagram, Weibo (referred to as Sina Weibo), Tencent Weibo, or the like for providing a social networking service, and the social application is, but not limited to, LINE, Skype, WhatsApp, WeChat, QQ, KakaoTalk or the like for providing a real-time communication service.

In an exemplary embodiment, the sharing control icon 22 is an accelerator key for quickly and predeterminedly linking to a social networking website or a social application. When a user selects the sharing control icon 22 shown in the second unlocking interface 2, the electronic device transmits the image of at least a part of the second unlocking interface 2 to the preset social networking website or social application.

Figure 6:
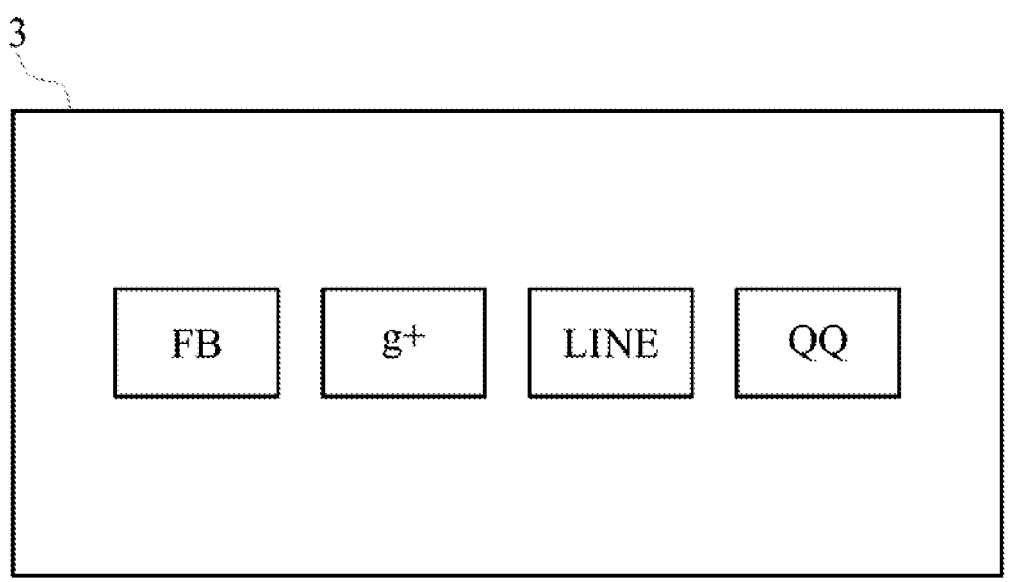
FIG. 6 is a schematic diagram of a secondary interface according to an embodiment.

In another exemplary embodiment, when a user selects the sharing control icon 22 shown in the second unlocking interface 2, the electronic device enables a secondary interface 3 as shown in FIG. 6, which is a schematic diagram of a secondary interface according to an embodiment. The secondary interface 3 displays all social networking websites or displays types of social application supported by the electronic device. Therefore, the user can select at least a representative icon to a social networking website or a social application in the secondary interface 3 to send the image of a part of the second unlocking interface 2 to the selected social networking website or social application.

Moreover, during the transmission of the image of a part of the second unlocking interface 2, the electronic device also transmits the drawing made up of the movement trace 12 to the foregoing randomly-selected or determinedly-selected social networking website or social application. Therefore, friends of the user or other network users can browse the drawing.

In an exemplary embodiment, the background image 24 of the second unlocking interface 2 changes while the graphic pattern most similar to the movement trace 12 changes. For example, if the movement trace 12 matches the graphic pattern showing a human face the most, the second unlocking interface 2 will show the text data 20 describing what the human face looks like, as well as a background image 24 belonging to a first type. For example, if the movement trace 12 matches the graphic pattern showing a house the most, the second unlocking interface 2 will show the text data 20 describing how the appearance of the house is, and the background image 24 belonging to a second type.

In another exemplary embodiment, the background image 24 of the second unlocking interface 2 is unchangeable, that is, the background image 24 will not change while the movement trace 12 changes. For instance, the background image 24 shows a logo of a certain company or brand or shows discount information, which appropriately carries out the embedded marketing and advertisement. The disclosure has no limit on the location and figure of the sharing control icon 22 shown in the second unlocking interface 2.

Figure 5B:
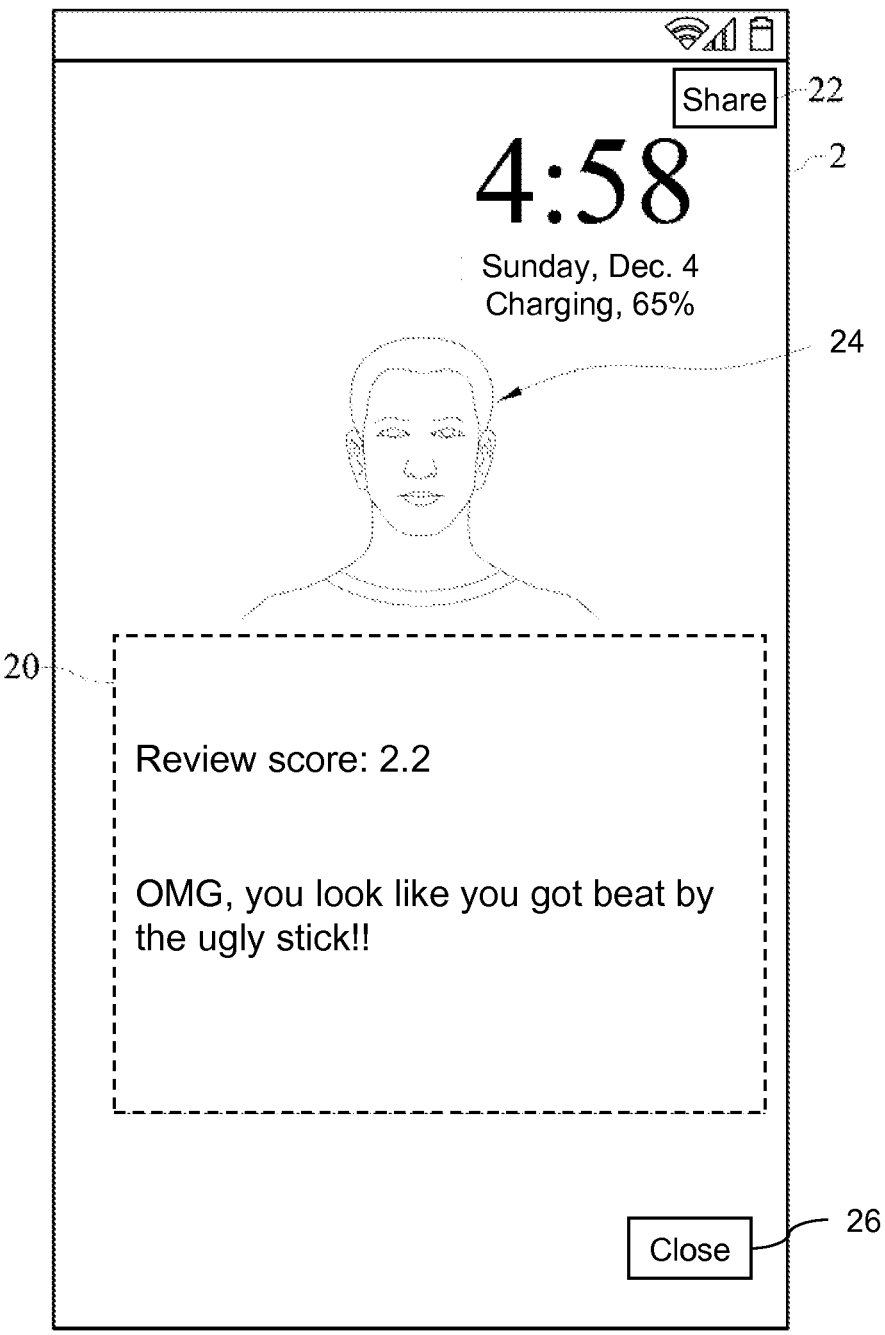
FIG. 5B is a schematic diagram of a second unlocking interface according to another embodiment.

Please refer to FIG. 5B, which is a schematic diagram of a second unlocking interface 2' according to another embodiment. The second unlocking interface 2' shows the foregoing text data 20, the foregoing sharing control icon 22, the foregoing background image 24, and a disabling control icon 26 (referred to as second control icon). The disabling control icon 26 is used for disabling the second unlocking interface 2' and enabling a home interface (referred to as user interface (UI)) of the electronic device. The disclosure has no limit on the locations and drawings of the sharing control icon 22 and the disabling control icon 26 in the second unlocking interface 2'. For example, the disabling control icon 26 is a x mark located at the upper left corner or upper right corner of the second unlocking interface 2'.

Subsequently, in step S108 in FIG. 1, the electronic device selects the image of at least a part of the second unlocking interface 2 shown in FIG. 5A or the image of at least a part of the second unlocking interface 2' shown in FIG. 5B, sends the selected image to the foregoing randomly-selected or predeterminedly-selected social networking website or social application, and after a preset condition is satisfied, disables the screen-locked state. The preset condition herein, for example but not limited to, is transmitting at least the image of a part of the second unlocking interface 2 or the image of a part of the second unlocking interface 2' to a randomly-selected or predeterminedly-selected social networking website or social application after the sharing control icon 22 shown in the second unlocking interface 2 or the second unlocking interface 2' is selected, is that the second unlocking interface 2 or the second unlocking interface 2' has been idle for more than a preset time period (e.g. 10 seconds), or is selecting the disabling control icon 26 shown in the second unlocking interface 2'.

On the other hand, to protect the electronic device from accidental screen unlocking, the electronic device in step S102 further determines whether the movement trace 12 is longer than a preset length, to determine whether to compare the movement trace 12 with each graphic pattern. If the movement trace 12 is longer than the preset length, the electronic device will compare the movement trace 12 with each graphic pattern. If the movement trace 12 is shorter than the preset length, the electronic device will continue detecting the movement trace 12 of the object on the touch screen. The disclosure has no limit on the preset length, and the preset length can be designed according to actual application requirements.

In one or more above embodiments, the screen unlocking method can be applied to any electronic device having a touch screen. By the screen unlocking method, the electronic device under the screen-locked state displays an unlocking mark on the touch screen and detects a movement trace of an object touching the touch screen. When the object touches the unlocking mark, the electronic device performs similarity comparison to the movement trace and graphic patterns to search for a graphic pattern most similar to the movement trace. When the graphic pattern most similar to the movement trace is found out, the text data corresponding to the found graphic pattern is displayed on the touch screen and the image of at least one part of content shown on the touch screen may be sent to a randomly-selected or predeterminedly-selected social networking website or social application. The movement trace is accumulated until the unlocking mark is touched, and the graphic patterns are stored in the electronic device. Moreover, since the image of at least one part of content shown on the touch screen is selectively sent to a randomly-selected or predeterminedly-selected social networking website or social application, the disclosure may provide users some fun and may support the product placement (referred to as embedded marketing) and achieve the advertisement of certain information, thereby increase the exposure, business value and utility of the electronic device.

What is claimed is:

1. A screen unlocking method applied to an electronic device comprising a touch screen and storing a plurality of graphic patterns and a plurality of text data, each of the plurality of graphic patterns corresponding to one of the plurality of text data, the screen unlocking method comprising:
    displaying an unlocking mark on the touch screen under a screen-locked state;
    detecting a movement trace of an object touching the touch screen, and determining whether the object touches the unlocking mark;
    when the object touches the unlocking mark, comparing the movement trace with each of the plurality of graphic patterns to search for a graphic pattern most similar to the movement trace;
    enabling an interface for displaying at least the text data corresponding to the graphic pattern most similar to the movement trace after the graphic pattern most similar to the movement trace is found out; and
    selectively transmitting an image of at least a part of the interface to a social networking website or a social application that is random or preset, and unlocking the touch screen after a preset condition is satisfied.

2. The screen unlocking method according to claim 1, wherein the step of determining whether the object touches the unlocking mark comprises: determining whether the movement trace is longer than a preset length, to selectively compare the movement trace with each of the plurality of graphic patterns.

3. The screen unlocking method according to claim 2, wherein when the movement trace is longer than the preset length, the step of comparing the movement trace with each of the plurality of graphic patterns is performed, and when the movement trace is shorter than the preset length, the detection of the movement trace is continued.

4. The screen unlocking method according to claim 1, wherein the interface comprises a first control icon for controlling the transmission of the image.

5. The screen unlocking method according to claim 4, wherein a secondary interface for displaying all social networking websites or displaying types of social application supported by the electronic device is enabled after the first control icon is selected.

6. The screen unlocking method according to claim 1, wherein the preset condition of transmitting the image to the social networking website or the social application, is that the interface has idled for more than a preset time period, or is selecting a second control icon that is provided by the interface and is used for enabling a home interface of the electronic device instead of the interface.

7. The screen unlocking method according to claim 1, wherein a background image of the interface is varied according to the graphic pattern most similar to the movement trace.

8. The screen unlocking method according to claim 1, wherein when the image is transmitted to the social networking website or the social application, a drawing of the movement trace is transmitted to the social networking website or the social application.

9. The screen unlocking method according to claim 1, wherein each of the plurality of text data comprises a review whose content is associated with content of the graphic pattern corresponding to the text data.

10. The screen unlocking method according to claim 9, wherein each of the plurality of text data further comprises a review score that is a certain value associated with the content of the graphic pattern corresponding to the text data.

11. The screen unlocking method according to claim 9, wherein each of the plurality of text data further comprises a review score that is directly proportional to a degree of similarity between the movement trace and the graphic pattern most similar to the movement trace.

12. The screen unlocking method according to claim 1, wherein the electronic device further comprises a communication interface, and after connecting to a server system through the communication interface, the electronic device updates the plurality of graphic patterns and the plurality of text data in the electronic device.

* * * * *